(12) United States Patent
Lim et al.

(10) Patent No.: US 9,413,951 B2
(45) Date of Patent: Aug. 9, 2016

(54) DYNAMIC MOTION ESTIMATION AND COMPENSATION FOR TEMPORAL FILTERING

(71) Applicant: Apple Inc., Cupertino, CA (US)

(72) Inventors: Suk Hwan Lim, Mountain View, CA (US); D. Amnon Silverstein, Palo Alto, CA (US); Sheng Lin, San Jose, CA (US)

(73) Assignee: Apple Inc., Cupertino, CA (US)

( * ) Notice: Subject to any disclaimer, the term of this patent is extended or adjusted under 35 U.S.C. 154(b) by 22 days.

(21) Appl. No.: 14/449,016

(22) Filed: Jul. 31, 2014

(65) Prior Publication Data

US 2016/0037061 A1    Feb. 4, 2016

(51) Int. Cl.
*H04N 5/232* (2006.01)
*G06T 5/10* (2006.01)

(52) U.S. Cl.
CPC .............. *H04N 5/23229* (2013.01); *G06T 5/10* (2013.01); *G06T 2207/20182* (2013.01)

(58) Field of Classification Search
CPC ................. H04N 5/23229; G06T 5/10; G06T 2207/20182
USPC ........................................................ 348/241
See application file for complete search history.

(56) References Cited

U.S. PATENT DOCUMENTS

| | | | |
|---|---|---|---|
| 6,157,677 A | 12/2000 | Martens et al. | |
| 7,822,287 B2 | 10/2010 | Frank | |
| 7,881,387 B2 | 2/2011 | Han et al. | |
| 7,991,196 B2 | 8/2011 | Tener et al. | |
| 8,619,881 B2 | 12/2013 | Schoenblum | |
| 8,698,834 B2 | 4/2014 | Brown Elliott | |
| 2004/0252230 A1* | 12/2004 | Winder | G06T 7/2053 348/402.1 |
| 2004/0252759 A1* | 12/2004 | Winder | H04N 5/145 375/240.12 |
| 2007/0014445 A1 | 1/2007 | Lin | |
| 2008/0062327 A1* | 3/2008 | MacInnis | G06T 5/50 348/701 |
| 2011/0090351 A1 | 4/2011 | Cote et al. | |
| 2013/0038745 A1 | 2/2013 | Myokan | |

(Continued)

FOREIGN PATENT DOCUMENTS

| | | |
|---|---|---|
| WO | 2013049412 | 4/2013 |
| WO | 2014074601 | 5/2014 |

OTHER PUBLICATIONS

U.S. Appl. No. 14/449,010, filed Jul. 31, 2014, D. Amnon Silverstein, et al.

(Continued)

*Primary Examiner* — Gevell Selby
(74) *Attorney, Agent, or Firm* — Robert C. Kowert; Meyertons, Hood, Kivlin, Kowert & Goetzel, P.C.

(57) ABSTRACT

A temporal filter may perform dynamic motion estimation and compensation for filtering an image frame. A row of pixels in an image frame received for processing at the temporal filter may be received. A motion estimate may be dynamically determined that registers a previously filtered reference image frame with respect to the row of pixels in the image frame. The reference image frame may be aligned according to the determined motion estimate, and pixels in the row of the image frame may be blended with corresponding pixels in the aligned reference image frame to generate a filtered version of the image frame. Motion statistics may be collected for subsequent processing based on the motion estimation and alignment for the row of pixels in the image frame.

20 Claims, 9 Drawing Sheets

(56) References Cited

U.S. PATENT DOCUMENTS

| | | |
|---|---|---|
| 2013/0070965 A1 | 3/2013 | Jang et al. |
| 2013/0094569 A1 | 4/2013 | Chong et al. |
| 2013/0266079 A1 | 10/2013 | Huang et al. |
| 2013/0321673 A1* | 12/2013 | Lim ............... H04N 17/002 348/241 |
| 2014/0003528 A1 | 1/2014 | Tourapis |
| 2014/0078347 A1 | 3/2014 | DeBattista |

OTHER PUBLICATIONS

U.S. Appl. No. 14/449,011, filed Jul. 31, 2014, Suk Hwan Lim, et al.
U.S. Appl. No. 14/449,015, filed Jul. 31, 2014, Suk Hwan Lim, et al.

* cited by examiner

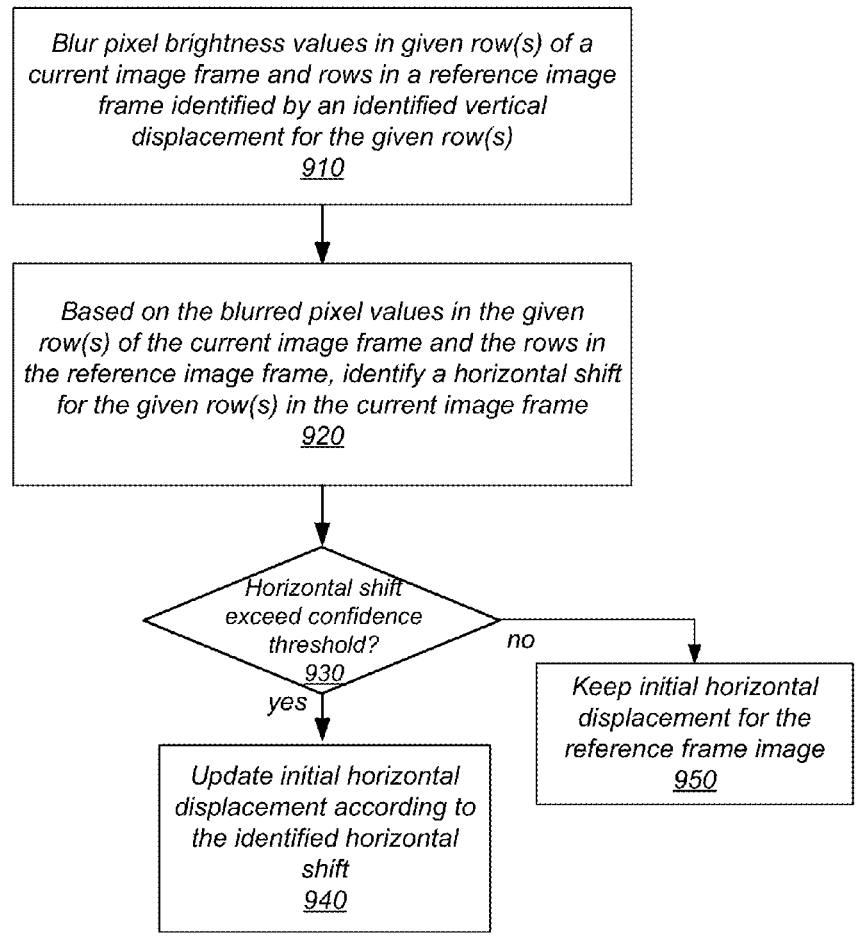
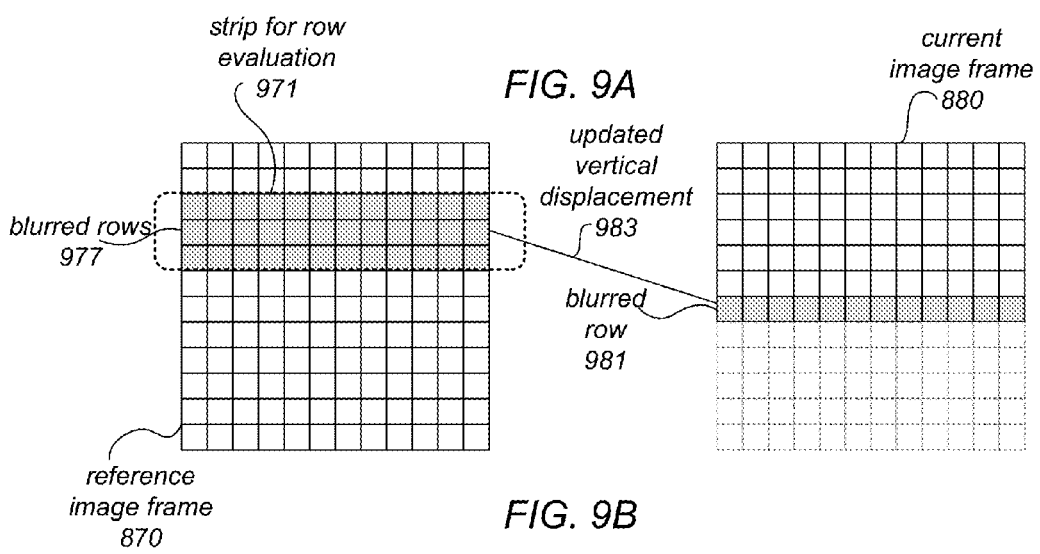
FIG. 9A
FIG. 9B

DYNAMIC MOTION ESTIMATION AND COMPENSATION FOR TEMPORAL FILTERING

BACKGROUND

Image data captured by an image sensor is often initially processed as part of an image processing pipeline in order to prepare the captured image data for further processing or consumption. In this way, real-time corrections and/or enhancements can be made without consuming other system resources. For example, raw image data may be corrected, filtered, or otherwise modified to provide subsequent components, such as a video encoder, with appropriately scaled image data for encoding and subsequent display, reducing a number of subsequent operations to be performed on the image data at the video encoder.

In order to implement these corrections and/or enhancements for captured image data, various different devices, components, units, or other modules may be used to implement the varying operations performed as part of an image processing pipeline. An image signal processor, for instance, may include multiple different units or stages at which different image modifications or enhancements can be made to image data obtained from an image sensor. Given the ubiquity of image sensors in many different products, efficiently handling image data as part of an image processing pipeline may confer relief on those products with constrained resources for performing additional tasks.

SUMMARY

An image signal processor of a device, apparatus, or computing system that includes a camera capable of capturing image data may, in some embodiments, be configured to perform temporal filtering on image data received from the camera's image sensor. A stream of pixels of a captured image frame may be processed at the temporal filter in order to reduce image noise. The temporal filter may implement a dynamic motion estimation and compensation technique to align a previously filtered reference image frame with different rows of pixels in the captured image frame. The temporal filter may perform a blending technique to generate a version of the captured image frame filtered based on a previously filtered image frame. The filtered version of the captured image frame may then be stored to filter the next image frame received at the temporal filter.

BRIEF DESCRIPTION OF THE DRAWINGS

FIG. 9A is a high-level flowchart illustrating various methods and techniques for performing horizontal motion estimation, according to some embodiments.

FIG. 9B is an example illustration of a current image frame and a reference image frame, according to some embodiments.

Figure 1:
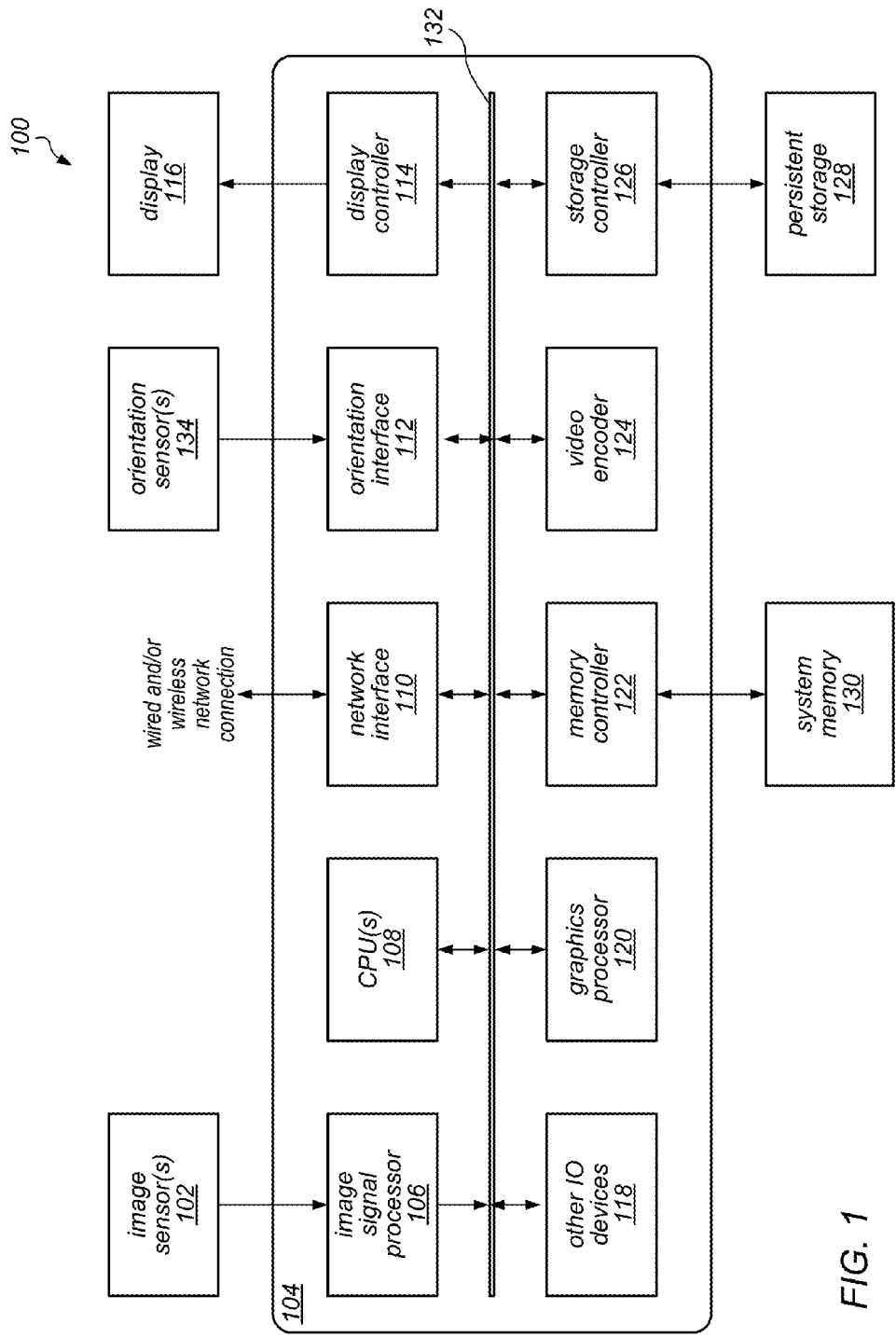
FIG. 1 is a logical block diagram illustrating an example system that may implement an image processing pipeline that performs temporal filtering using dynamic motion estimation and compensation, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, paragraph (f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

An image signal processor or other image processing pipeline may implement many different techniques and/or components to correct or enhance image data captured by an image sensor. In various embodiments, temporal filtering may perform noise filtering on image data. Temporal filtering is based on filtering the pixel values of a current image frame captured at an image sensor using pixel values of a previously filtered image frame. Pixel values from the previously filtered image frame, referred to herein as the reference image frame, may be combined with the pixel values of the current image frame to get a best estimate of the pixel values with reduced noise. Over time, as more image frames are filtered at the temporal filter, the reference image frame may provide a higher quality image with less noise.

As movement may occur, either as a result of moving the image sensor, or moving objects within view of the sensor, the corresponding location of a pixel in a current image frame received for filtering may be different than a previously filtered image frame used as a reference image frame. For example, as a result of an image sensor panning to the left, a pixel in a current image frame (e.g., located at coordinates (122, 32) may actually correspond to a pixel further to the right (e.g., located at coordinates (124, 32)). Motion estimation and compensation may be implemented to detect this movement and compensate for the movement when blending the two frames (e.g., blending pixel value of the current image frame at (122, 32) and the pixel value of the reference image frame at (124,32)), improving the noise reduction for the filtered version of the current image frame. Without motion compensation, the temporal filter may blend the pixel values at the same location in each image frame (e.g., current image frame pixel at (122, 32) and reference image frame pixel at (122, 32)), which may reduce the quality of the noise filtering.

Typically, motion estimation and compensation techniques are implemented post-processing. In other words, two image frames are available to be analyzed in their entirety to estimate the motion that occurred. However, image data captured at image sensors is often streamed live from the sensor into an image processing pipeline and thus image processing pipeline components may not be able to operate on the entire set of image data captured for a new image frame. Dynamic motion estimation and compensation may be implemented to determine a motion estimate and resulting compensation on-the-fly for image data in a new image frame, without access to two complete image frames. In various embodiments, a motion estimate may be dynamically determined for a given one or more rows in a stream of pixels in an image frame with respect to a reference image frame. The reference image frame may then be aligned to the given one or more rows of pixels in the image frame according to the motion estimate. Blending may then be performed for the pixels in the row image data with different corresponding pixels in the aligned reference image frame to generate filtered versions of the pixels which may then be maintained as part of a filtered version of the image frame.

The techniques described herein for introducing a frame delay using a temporal filter may be further illustrated in terms of an example system that employs them. As noted above, these techniques may be implemented in any type of camera, apparatus, or computing system that includes the capability to capture and process image data, including video clips.

One example of a system that is configured to implement any or all of the techniques described herein is illustrated in FIG. 1. For example, system 100 illustrated in FIG. 1 may be configured to perform image processing using an image signal processor without the additional system memory operations required by existing GPU and CPU approaches. In the illustrated embodiment, system 100 includes an image sensor 102, a system-on-a chip (SOC) component 104, system memory (e.g., DRAM) 130, persistent storage (e.g., flash memory) 128, and a display 116 (e.g., LCD). In this example, image sensor 102 may be any type of image sensor suitable for capturing image data (e.g., an image sensor that is responsive to captured light), such as an active-pixel sensor (e.g., complementary metal-oxide-semiconductor (CMOS) active-pixel sensor) on a camera, video camera, or other device that includes a camera or video camera. In this example, display 116 may be configured to display a preview of captured still images and/or video clips. Display 116 may also be configured to display menus, selected operating parameters, or other information received from a user interface of the system (not shown). In other embodiments, other types of display devices may be included in the system for these purposes. In different embodiments, system 100 may be any of various types of devices, including, but not limited to, a personal computer system; a desktop computer; a laptop computer; a notebook, tablet, slate, or netbook computer; a mainframe computer system; a handheld computer; a workstation; a network computer; a camera; a set top box; a mobile device, such as a mobile phone, pager, personal data assistant (PDA), tablet device, or music player; an I/O device such as a digital camera, a scanner, a video recorder; a consumer device; a video game console; a handheld video game device; or in general any type of computing or electronic device that includes the functionality of a camera or video camera.

In this example, the SOC component 104 includes an image signal processor (ISP) 106, a central processor unit (CPU) 108, a network interface 110, orientation interface 112 (which may be coupled to orientation sensor(s) 134 (e.g., gyroscope) from which system 100 orientation data, such as motion data, may be gathered), a display controller 114 (which may be coupled to and control the operations of display 116), a graphics processor (GPU) 120, memory controller 122 (which is coupled to system memory 130), a video encoder 124, a storage controller 126 (which is coupled to and controls access to persistent storage 128, such as flash memory or other non-volatile random access memory), and various other I/O devices (shown as 118), any or all of which may communicate with each other over interconnect 132. In some embodiments, system 100 and/or SOC component 104 may include more or fewer elements than those shown in FIG. 1.

In various embodiments, SOC component 104 may be a uniprocessor system including one processor, or a multiprocessor system including several processors (e.g., two, four, eight, or another suitable number). CPU(s) 108 may implement any suitable instruction set architecture, and may be configured to execute instructions defined in that instruction set architecture. For example, in various embodiments CPU(s) 108 may be general-purpose or embedded processors implementing any of a variety of instruction set architectures (ISAs), such as the x86, PowerPC, SPARC, RISC, or MIPS ISAs, or any other suitable ISA. In multiprocessor systems, each of CPU(s) 108 may commonly, but not necessarily, implement the same ISA. CPU 108 may employ any microarchitecture, including scalar, superscalar, pipelined, super-pipelined, out of order, in order, speculative, non-speculative, etc., or combinations thereof. CPU 108 may include circuitry to implement microcoding techniques. CPU 108 may include one or more processing cores each configured to execute instructions. CPU 108 may include one or more levels of caches, which may employ any size and any configuration (set associative, direct mapped, etc.).

In the example illustrated in FIG. 1, system memory 130 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit implementing system 100 in a chip-on-chip configuration, a package-on-package configuration, or a multi-chip module configuration. In some embodiments, system memory 130 may store pixel data or other image data or statistics in various formats. Similarly, while the example system 100 illustrated in FIG. 1 includes persistent storage 128 for non-volatile storage of image data and/or other data used in the system, in other embodiments, the system may include other types of non-volatile memory (e.g. ROM) for those purposes.

Graphics processing unit (GPU) 120 may include any suitable graphics processing circuitry. Generally, GPU 120 may be configured to render objects to be displayed into a frame buffer (e.g., one that includes pixel data for an entire frame). GPU 120 may include one or more graphics processors that may execute graphics software to perform a part or all of the graphics operation, and/or hardware acceleration of certain graphics operations. The amount of hardware acceleration and software implementation may vary from embodiment to embodiment.

I/O devices 118 may include any desired circuitry, depending on the type of system 100. For example, in one embodiment, system 100 may be a mobile computing device (e.g. personal digital assistant (PDA), tablet device, smart phone, etc.) and the I/O devices 118 may include devices for various types of wireless communication, such as WiFi, Bluetooth, cellular, global positioning system, etc. In some embodiments, I/O devices 118 may also include additional storage, including RAM storage, solid state storage, or disk storage. In some embodiments, I/O devices 118 may include user interface devices such as additional display devices, including touch display screens or multi-touch display screens, keyboards, keypads, touchpads, scanning devices, voice or optical recognition devices, microphones, speakers, scanners, printing devices, or any other devices suitable for entering or accessing data by or within system 100.

In this example, image signal processor (ISP) 106 may include dedicated hardware that may facilitate the performance of various stages of an image processing pipeline, as described in detail herein. In some embodiments, ISP 106 may be configured to receive image data from image sensor 102, and to the process the data into a form that is usable by other components of system 100 (including display 116 or video encoder 124). In some embodiments, ISP 106 may be configured to perform various image-manipulation operations such as image translation operations, horizontal and vertical scaling, color space conversion or other non-warping image editing operations, and/or image stabilization transformations, as described herein. One embodiment of an image signal processor is illustrated in more detail in FIG. 3 and described below.

In the example illustrated in FIG. 1, interconnect 132 may be configured to facilitate communications between the various functional units included in SOC 104. In various embodiments, interconnect 132 may include any suitable interconnect circuitry such as meshes, network on a chip fabrics, shared buses, point-to-point interconnects, etc. In some embodiments, interconnect 132 may perform any necessary protocol, timing or other data transformations to convert data signals from one component (e.g., system memory 130) into a format suitable for use by another component (e.g., CPU(s) 108 or GPU 120). In some embodiments, interconnect 132 may include support for devices attached through various types of peripheral buses, such as a variant of the Peripheral Component Interconnect (PCI) bus standard or the Universal Serial Bus (USB) standard, for example. In some embodiments, the function of interconnect 132 may be split into two or more separate components, such as a north bridge and a south bridge, for example. In some embodiments, interconnect 132 may facilitate the communication of pixel data or other image data or statistics to various functional units in the appropriate formats.

In this example, network interface 110 may be configured to allow data to be exchanged between system 100 and other devices attached to one or more networks (e.g., carrier or agent devices) or between nodes or components of system 100. The network(s) may in various embodiments include, but are not limited to, Local Area Networks (LANs) (e.g., an Ethernet or corporate network), Wide Area Networks (WANs) (e.g., the Internet), wireless data networks, some other electronic data network, or some combination thereof. In various embodiments, network interface 110 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network and/or protocol.

Those skilled in the art will appreciate that system 100 is merely illustrative and is not intended to limit the scope of embodiments. For example, system 100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available. In some embodiments program instructions stored in system memory 130 may be executed by CPU 108 and/or GPU 120 to provide various functions of system 100.

In other embodiments, various functions may be performed by software components executing in memory on another device and communicating with the illustrated system via inter-computer communication. Some or all of these software components and/or any data structures described herein may be stored (e.g., as instructions or structured data) in system memory 130, in persistent storage 128, or may be stored on a non-transitory computer-readable medium or a portable article to be read by an appropriate drive. In some embodiments, instructions stored on a computer-accessible medium separate from system 100 may be transmitted to system 100 via transmission media or signals such as electrical, electromagnetic, or digital signals, conveyed via a communication medium such as a network and/or a wireless link. Various embodiments may further include receiving, sending or storing instructions and/or data implemented in accordance with the descriptions herein. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc.

Figure 2:
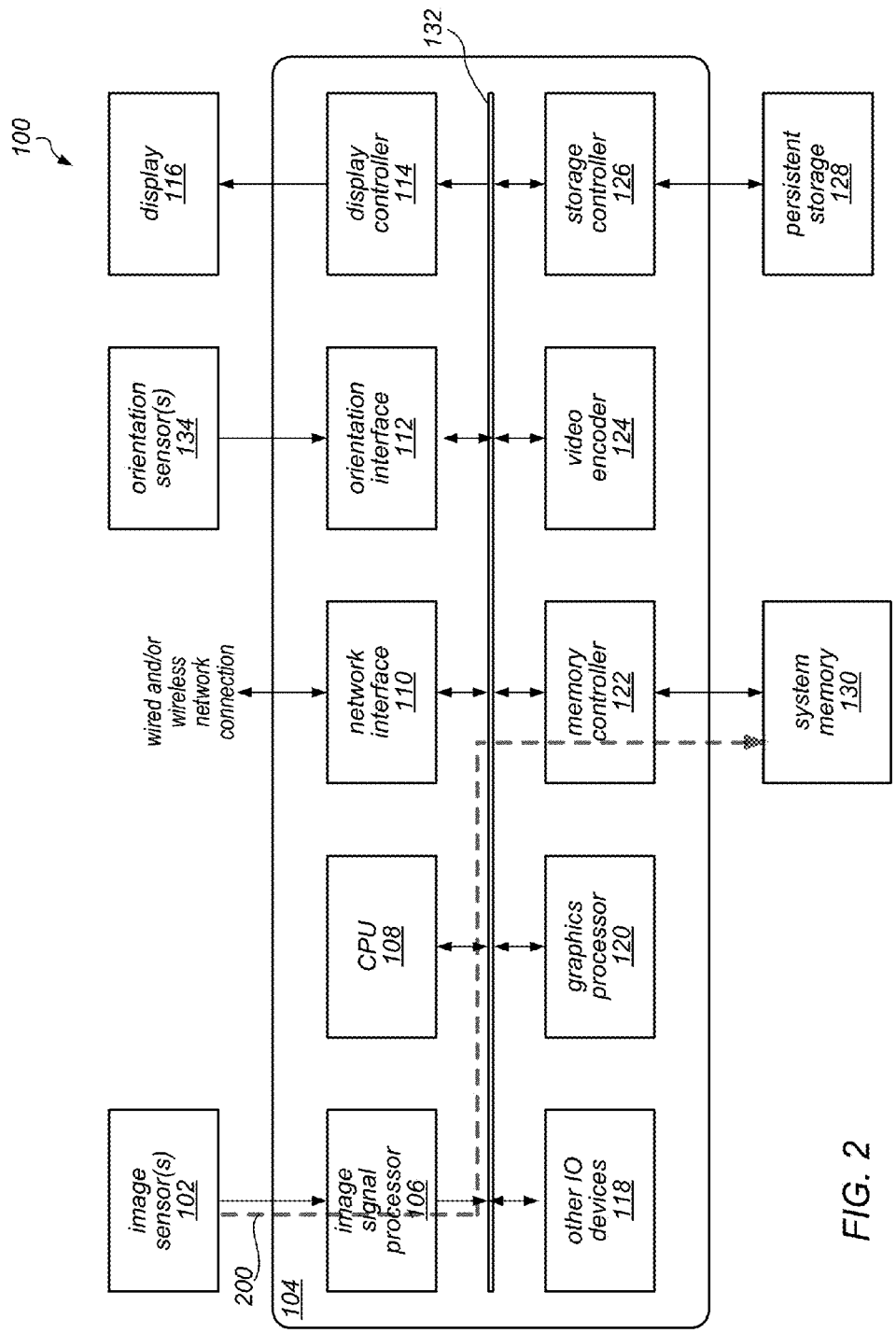
FIG. 2 is a logical block diagram illustrating an example data path in a system that may implement an image processing pipeline that performs temporal filtering using dynamic motion estimation and compensation, according to some embodiments.

FIG. 2 is a block diagram illustrating a data path in a system that implements an image signal processor (specifically, in system 100 illustrated in FIG. 1), according to some embodiments. As illustrated by the dashed lines in this example, image data may pass from the image sensor (102), through the image signal processor (106) to system memory 130 (by way of interconnect 132 and memory controller 122). Once the image data has been stored in system memory 130, it may be accessed by video encoder 124, display 116 (e.g., by way of interconnect 132 and, in the case of display 116, display controller 114). For example, it may be accessed by display controller 114 in order to display a preview on display 116, or may be accessed by video encoder 124, which may encode the data in a format suitable for video recording to persistent storage 128 (e.g., for storage), or for passing the data to network interface 110 for transmission over a network (e.g., for a video conference) or elsewhere, in various embodiments.

In some embodiments graphics processor 120 may access, manipulate, transform and/or otherwise process image data, and thus additional read and write operations may be performed on system memory 130 beyond those illustrated in FIG. 2. Image data that is stored in system memory 130 may be accessed by GPU 120 (by way of interconnect 132 and memory controller 122), and, after GPU 120 has performed one or more image transformations on the image data, the image data may be written back to system memory 130 (again, by way of interconnect 132 and memory controller 122). Similar data paths may be employed in system 100 between system memory 130 and CPU 108 if image processing is instead performed by CPU 108 (e.g., by software executing on CPU 108). In some embodiments (though not illustrated) image data out from image signal processor 106 may be sent directly (via interconnect 132) to another functional component (e.g., CPU 120, graphics processor 120, other I/O devices 118, network interface 110, video encoder 124, storage controller 126, and/or display controller 114) without storing the image data to system memory 130.

Figure 3:
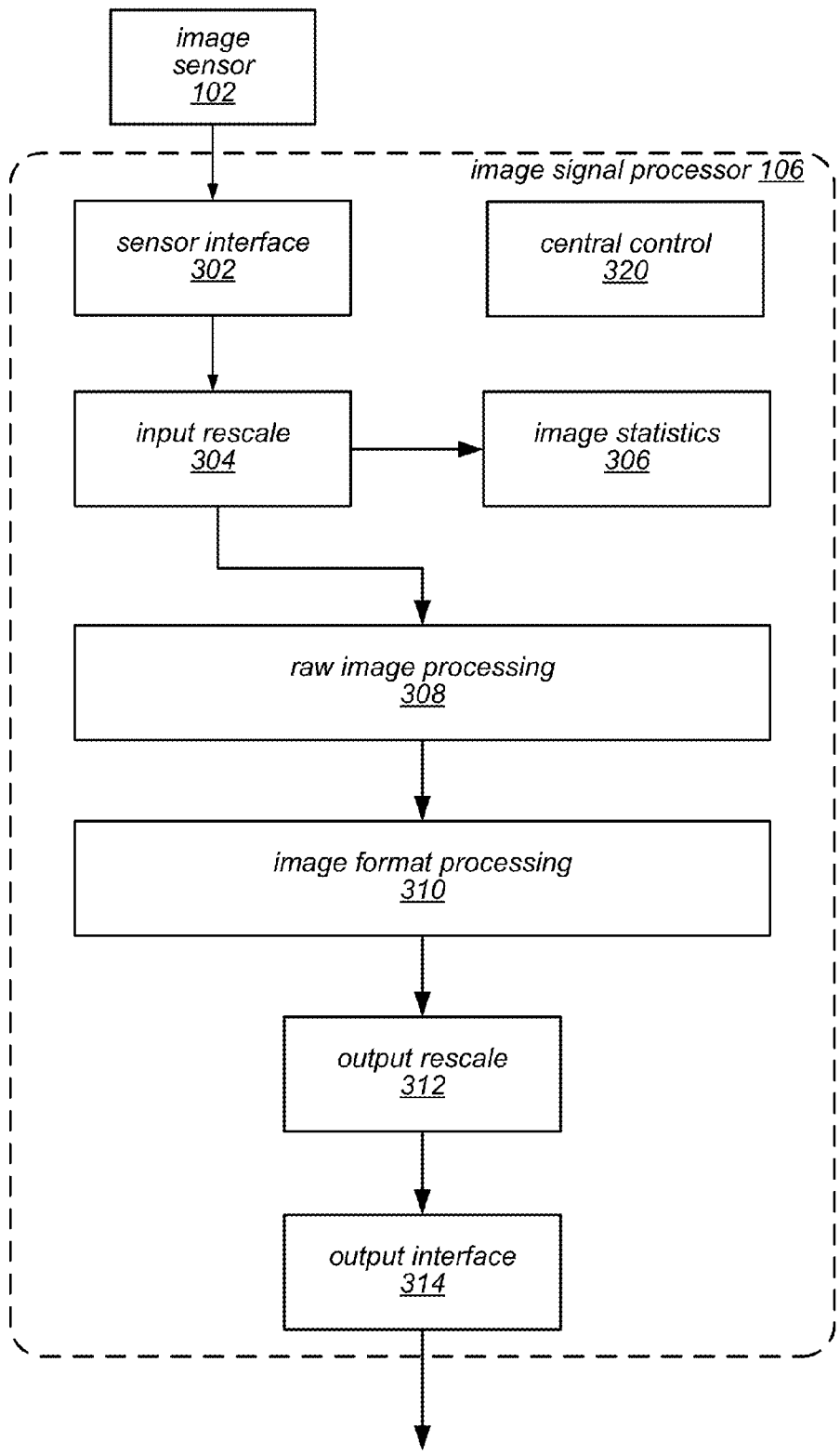
FIG. 3 is a logical block diagram illustrating an example image signal processor, according to some embodiments.

One embodiment of an image signal processing unit (ISP), such as image signal processor 106, is illustrated by the block diagram in FIG. 3. As illustrated in this example, ISP 106 may in various embodiments be coupled to an image sensor 102 (from which it receives image data). In this example, ISP 106 implements an image processing pipeline, i.e., a set of stages that process image information from creation (or capture) to output. For example, the various elements illustrated as components of ISP 106 process source data received from image sensor 102 through sensor interface 302 into image data usable by other stages in the pipeline (e.g., input rescale 304, image statistics 306, raw image processing 308, image format processing 310 or output rescale 312), by other components of a system that includes ISP 106 via output interface 314 (including those that access the transformed data from the system memory after it is written to the system memory via memory controller interface 122 or are provided the image data via interconnect 132 directly), and/or by other devices coupled to the system that includes ISP 106. Note that in some embodiments, the image signal processor 106 is a streaming device. In other words, pixels may be received by the image signal processor 106 from the image sensor 102 in raster order (i.e., horizontally, line by line) and may in general be processed through its various pipeline stages in raster order, until finally being output in raster order.

In various embodiments, image signal processor 106 may implement central control module 320. Central control module 320 may configure and start the processing of image data, in some embodiments. For example, central control module may implement performance monitors for logging clock cycles, memory latency, quality of service, and state information. Central control module 320 may update or manage control parameters for units, modules, stages, and/or other components of ISP 106, and may interface with sensor interface 302 to control the starting and stopping of the of the units, modules, stages, and/or other components. For example, in some embodiments, a unit, module, stage, and/or other component may go into an idle state during which programmable parameters may be updated by central control module 320. The unit, module, stage, and/or other component may then be placed into a run state, to perform one or more operations or tasks.

In various embodiments, central control module 320 may be configured to interact with a control process which may be implemented in software at various different layers or locations in SOC component 104 (e.g., application, operating system/kernel or device driver/interface). Programming instructions may be received from a control process that central control module 320 may be configured to implement. For example, central control module can modify programmable parameters for various different units or components with image signal processor, such as sensor interface 302, input rescale module 304, image statistics module 306, raw image processing unit 308, image format processing unit 310, output rescale 312, output interface 314, and/or any components implement within ISP 106 (e.g., temporal filter 400 illustrated in FIG. 4). If, for example, a programming instruction is received requesting that a frame delay setting for a temporal filter be enabled, then a corresponding parameter for the frame delay setting for the temporal filter may be indicated as enabled.

In the illustrated embodiment, ISP 106 may implement input rescale module 304. Input rescale module 304 may downscale full-resolution sensor images to a different resolution (e.g., video resolution) early in the image processing pipeline, which may reduce the power and bandwidth cost of image processing at later states, units, and/or modules of ISP 106, as well as for providing different image resolutions. In some embodiments, input rescale module 304 may perform various functions of other units or modules in the image processing pipeline. For example, in some embodiments, input rescale module 304 may perform a first-pass demosaic of Bayer image data received from image sensor 102, resampling, and then re-mosaicing the image data for the remainder of the image processing pipeline. Input rescale module 304 may handle pixel defects and filtering around highlight regions, such as performing defective pixel correction and performing a highlight-recovery pass. Input rescale module may also convert the image data between different color models, spaces or formats (e.g., RGB or YCbCr), as well as perform specialized color format techniques to correct/enhance raw image data (e.g., chrominance suppression in YCbCr).

In various embodiments, image signal processor 106 may implement image statistics module 306. Image statistics module 306 may perform various functions and collect information. For example image statistics module may, in some embodiments may perform sensor linearization, defective pixel replacement, black level compensation, lens shading correction, and inverse black level compensation, collecting image information as a result of the various operations. Other statistics, such as 3A statistics (Auto white balance (AWB), auto exposure (AE), auto focus (AF)), histograms (e.g., 2D color or component), or any other image data information may be collected or tracked. Thus, the previous examples are not intended to be limiting.

In some embodiments, the image statistics collected at image statistics module 306, as well as other information or statistics, may be written to memory and/or provided to a control process for ISP 106. For instance, motion vectors or other indicators of motion between image frames may be determined at a temporal filter, in some embodiments, and may be provided to a control process for programming subsequent components that may account for the determined motion.

In various embodiments image signal processor 106 may implement raw image processing module 308. Raw image processing module 308 may, in various embodiments implement a variety of modules, units, and/or components to perform various operations, functions, or tasks on raw image data (e.g., Bayer format), in different orders, such as sensor linearization, black level compensation, fixed pattern noise reduction, temporal filtering, defective pixel correction, spatial noise filtering, lens shading correction, white balance gain, highlight recovery, and/or raw scaling. A sensor linearization unit may, in some embodiments, map non-linear image data to linear space. Black level compensation may be performed to provide digital gain, offset and clip independently for each color component (e.g., Gr,R,B,Gb) on the pixels image data (which may occur after sensor linearization). Fixed pattern noise reduction may be performed to remove offset fixed patter noise and gain fixed pattern noise by subtracting a dark frame from an input image and multiplying different gains to pixels, in some embodiments. Temporal filtering may perform noise filtering based on pixel values from previous image frame. Defective pixel correction may determine or identify defective pixels, and may replace defective pixel values. Spatial noise filter may reduce noise in image data by averaging neighbor pixels that are similar in brightness. Lens shading correction may apply a gain per pixel to compensate for a dropoff in intensity roughly proportional to a distance from a lens optical center. White balance gains may provide digital gains for white balance, offset and clip independently for all color component Gr,R,B,Gb. Highlight recovery may estimate pixel values for those pixels that are clipped (or nearly clipped) from other channels. Raw scaling may scale down image data in a raw format (e.g., Bayer format). Please note that various examples and descriptions provided above are not intended to be limiting as to the various techniques, components, or formats of raw image data implemented as part of raw image processing, but are instead merely provided as examples.

As noted above, in at least some embodiments, a temporal filter module, unit, or component may be implemented as part of raw image processing module 308, such as temporal filter module 400 described below with regard to FIG. 4. The temporal filter may perform noise filtering based on pixel values from a reference image frame. In some embodiments, the temporal filter may introduce a frame delay into the image processing pipeline of ISP 106 by providing the reference image frame instead of the current image frame. The frame delay may allow downstream processes, units, stages, or components time to gather more information for better analysis of image data, as well as allow downstream processes to be programmatically tailored to the image data. In various embodiments, the temporal filter may perform filtering based on a generated blending value for each pixel on a current image frame that is based on differences determined between neighboring pixels in the current image frame and a reference image frame. In some embodiments, the temporal filter may adjust blending values for pixels based on noise history maintained for the pixels, luminance, and/or radial factor. In some embodiments, the temporal filter may implement dynamic motion estimation and compensation for image data as it is received on the fly, so that a reference image frame may be shifted to align with a current frame before filtering.

In various embodiments, image signal processor 106 may implement image format processing module 310. Image format processing module 310 may, in various embodiments implement a variety of modules, units, and/or components to perform various operations, functions, or tasks, in different orders, such as demosaicing raw image data to RGB image format, local tone mapping, determining gain/offset/clip, color correction, 3D color lookup, RGB gamma mapping, color space conversion (e.g., to YCbCr), statistics collection, luma sharpening, chroma suppression, dynamic range compression, brightness, contrast and color adjustments, YCbCr gamma mapping, chroma decimation and chroma noise reduction. Demosaicing may interpolate missing color samples in image data. Local tone mapping may apply spatially varying local tone curves to image data. Gain, offset, and clip may be determined for each color component in RGB image data. Color correction may be performed using an RGB color correction matrix. RGB gamma mapping may provide a mapping between RGB values using a lookup table for gamma correction. Color space conversion may convert image data to another color format or space (e.g., RBG to YCbCr). Luma sharpening may sharpen luma values. Chroma suppression may attenuate chroma to gray (i.e. no color). Noise in chrominance channels may be filtered. Please note that various examples and descriptions provided above are not intended to be limiting as to the various techniques or components implemented as part of image format processing, but are instead merely provided as examples.

In various embodiments, image signal processor 106 may implement output rescale module 312. Output rescale module 312 may resample, transform and correct distortion on the fly as the ISP 160 processes image data. Output rescale module 312 may compute a fractional input coordinate for each pixel and uses this fractional coordinate to interpolate an output pixel via a polyphase resampling filter, in some embodiments. A fractional input coordinate may be produced from a variety of possible transforms of an output coordinate, such as resizing and/or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 312 may, in various embodiments, apply transforms to image data as it is processed at output rescale module 312. Output rescale module 312 may include horizontal and vertical scaling components. The vertical portion of the design may implement series of image data line buffers to hold the "support" needed by the vertical filter. As ISP 106 may be a streaming device, it may be that only the lines of image data in a finite-length sliding window of lines are available for the filter to use. Once a line has been discarded to make room for a new incoming line, the line may be unavailable. Output rescale module 312 may statistically monitor computed input Y coordinates over previous lines and use it to compute an optimal set of lines to hold in the vertical support window. For each subsequent line, output rescale module may generate a best guess of where to center the vertical support window automatically. In some embodiments, output rescale module 312 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame.

Note also that, in various embodiments, the functionally of units 302-314 may be performed in a different order than the order implied by the order of these functional units in the image processing pipeline illustrated in FIG. 3, or may be performed by different functional units than those illustrated in FIG. 3. Image data may not pass directly from one component to another but may be stored in memory or other storage locations and accessed by different components in order to perform processing. Moreover, the various components, units, processes, or other functionalities described in FIG. 3 (or subsequent FIGS. 4-6) may be implemented in various combinations of hardware and/or software.

As noted above, in various embodiments a temporal filer may be implemented as part of an image processing pipeline in an image signal processor, such as image signal processor 106, described above with regard to FIG. 3. A temporal filter may perform noise filtering based on pixel values from a previously filtered image frame. Pixel values from the previously filtered image frame (which may be referred to herein as the reference image frame), may be combined with pixel values of a current image frame to get a best estimate of the pixel values. For example, the temporal filter may average the pixel values in the current image frame and the corresponding pixels in the reference image frame when the current image frame and the reference image frame are similar. In another example, when the pixels of the current image frame and the corresponding pixels of the reference image frame are significantly different (e.g., due to camera motion or object movement in the scene), filtering strength that blends the reference image frame with the current image frame may be reduced (e.g., to avoid trailing or ghosting artifacts). In at least some embodiments, the temporal filter may be adaptive through programmatic (e.g., software) controls based on brightness and/or radial pixel location. FIG. 4 is a logical block diagram illustrating a temporal filter that may be implemented as part of an image processing pipeline, according to some embodiments.

Temporal filter 400 may be a module or component implemented as part of an image processing pipeline, such as image signal processor 106 illustrated above in FIG. 3. In at least some embodiments, temporal filter 400 may be implemented as part of raw image processing unit 308. In some embodiments, temporal filter module 400 may receive image data (e.g., pixels) that has been processed at one or more proceeding components implemented within raw image processing unit 308. For example, in some embodiments, other filters or correction components, such as sensor linearization, black level compensation, and/or fixed noise pattern modules may process image data and provide that image data to temporal filter module 400.

The image data provided to temporal filter 400 may, in some embodiments, be implemented as raw image data (e.g., the same image data format as provided directly to the image signal processor from an image sensor). There may be many different types of raw image data formats, which may include different sizes or configurations of image information for a pixel value (e.g., different MIPI-CSI data types or different image sensor configurations such as different Bayer filters). Current image frame 404 may be image data (e.g., pixels) of a current image that are received at temporal filter 400 in order to generate a filtered version of the pixels as part of generating a filtered version of the current image frame being processed (e.g., live image data from the image sensor or stored image data in a memory/buffer). For instance, current image frame 404 may illustrate individual Bayer pixels of a current image frame in Bayer format that are received for filtering. Please note, as discussed above, image data at temporal filter 400, as well as other components of image signal processor 106 may be processed on a per pixel basis, such that a stream of individual pixels are received for filtering individually at temporal filter 400.

Reference image frame 402 may be image data (e.g., pixel values) stored as part of a reference image frame that was previously filtered at temporal filter 400. Reference image frame 402 may be received from a buffer or memory maintaining the image data for the reference image frame. Reference image frame 402 may be a same type of image data format as current image frame 404 (e.g., Bayer pixels).

Although not illustrated, in some embodiments, if differences in exposure or changes in lighting occur between reference image frame 402 and current image frame 404, it may be advantageous to adjust the brightness of the image data for the two frames so that the differences in exposure or changes in lighting do not adversely affect various analysis, modifications, or other components of temporal filter 400 with respect to the two frames. A respective normalization component may be implemented to adjust the gain and black level for the reference image frame 402 and/or the current image frame 404 respectively. For example, reference image frame 402 may be 10% brighter than the current image frame 404 (e.g., which can happen when the exposure is changing between the frames due to a function like auto-exposure trying to expose the image sensor optimally). If the brightness is different, motion estimation and compensation component 410 may give an erroneous result since the motion estimation algorithm may assume brightness is constant along the motion trajectory. In another example of adverse effect, if the brightness of reference image frame 402 and current image frame 404 does not match, a higher number of pixels in the current image frame 404 would be considered different enough than the reference image frame causing spatially-based filter generator 420 to generate a filter that effectively "turns down" the filtering strength for the reference image frame 402. These and other adverse effects would reduce the quality of the filtering at temporal filter 400 (e.g., when there is only a global brightness difference between the two frames).

Normalization of brightness may be performed by compensating for the exposure differences that may be derived from the differences in exposure times and sensor gains, in various embodiments. For example, current image frame 404 may be scaled based on a set of gain and offset values. Similarly, reference image frame 402 may be scaled based on a separate set of gain and offset values.

In some embodiments, reference image frame 402 and current image frame 404 may be provided to motion estimation and compensation component 410. Motion estimation and compensation component 410 may estimate motion between the reference image frame 402 and the current image frame 404. The estimated motion may then be used to locally shift (or warp) the reference image frame 402 such that the shifted frame is better aligned to the current image frame 404. Motion estimation and compensation component 410 may be configured to perform motion compensation dynamically without access to the entirety of both of the reference image frame 402 and the current image frame 404. Thus, warped reference image frame 412 may be provided to spatially-based filter generator 420 and filtered image frame generator 440.

Temporal filter 400 may blend the warped reference image frame 412 and the current image frame 404. The blending (or mixing) ratio may vary from pixel to pixel based on how similar a given pixel in the current image frame 404 is compared to a corresponding pixel in the warped reference image frame 412. Spatially-based filter generator 420 may be configured to determine the difference between a given pixel in the current image frame 404 and the corresponding image pixel in the warped reference image frame 412 based on pixels in the current image frame 404 neighboring the given pixel in the current image frame 404, and the corresponding pixels of those neighboring pixels in the warped reference image frame 412. A filter weight 422 may be generated that can be applied to blend the given pixel of the current image frame 404 with the corresponding pixel of the warped reference image frame 412. For example, if the given pixel in the current image frame 404 is similar to a pixel value in the reference frame, then the corresponding pixel of the warped reference image frame 412 pixel may get the majority of the weight in the filtered version of the given pixel.

The generated filter 422 may, in some embodiments, be provided to historically-based filter adjustment component 430. Historically-based filter adjustment component 430 may modify the filter 422 based on noise history maintained for the corresponding pixel of the warped reference image frame 412. Modified filter 432 may be provided to filtered image frame generator 440, which may blend the corresponding pixel of warped reference image frame 412 with the given pixel of current image frame 404 according to the modified filter 432 to generate a filtered version of the given pixel. For example, modified filter 432 may be represented as a value k, which may be used to determine the proportions of the corresponding pixel of warped reference image frame 412 and the given pixel of current image frame 404 to be blended. If k=0.7, then 70% of the filtered version of the given pixel may be from the corresponding pixel in warped reference image frame 412 and 1−k (0.3 or 30%) of the filtered version of the given pixel may be from the given pixel of the current image frame 404. The filtered version of the given pixel may be sent to the reference frame buffer 444 (e.g., written to system memory) to be maintained as part of a filtered version of the current image frame 404, which may be provided as reference image frame 402 for the next current image frame 404 received at temporal filter 400.

In some embodiments, frame output selection component 450 may be implemented as part of temporal filter 400, which may determine whether to provide filtered image frame 442 or reference image frame 402 (not warped) to a downstream unit or component in the image processing pipeline as output image frame 452 (e.g., a component downstream in raw image processing unit 308, image format processing unit 310, output rescale unit 312, and/or output interface 314. Providing the reference image frame 402 may introduce a frame delay into the image processing pipeline, which may be utilized to programmatically configure a component downstream in the image processing pipeline. Frame output selection component 450 may determine which image frame to provide based on a frame delay selection 406 (which may be programmed by central control module 320) indicating whether a delay setting is enabled or disabled. Note, that in some embodiments, the image frame delay may always be provided (or be provided by default). Thus, in some embodiments, frame output selection may not be implemented as the frame delay may be permanently implemented when processing pixels at temporal filter 400.

Figure 4:
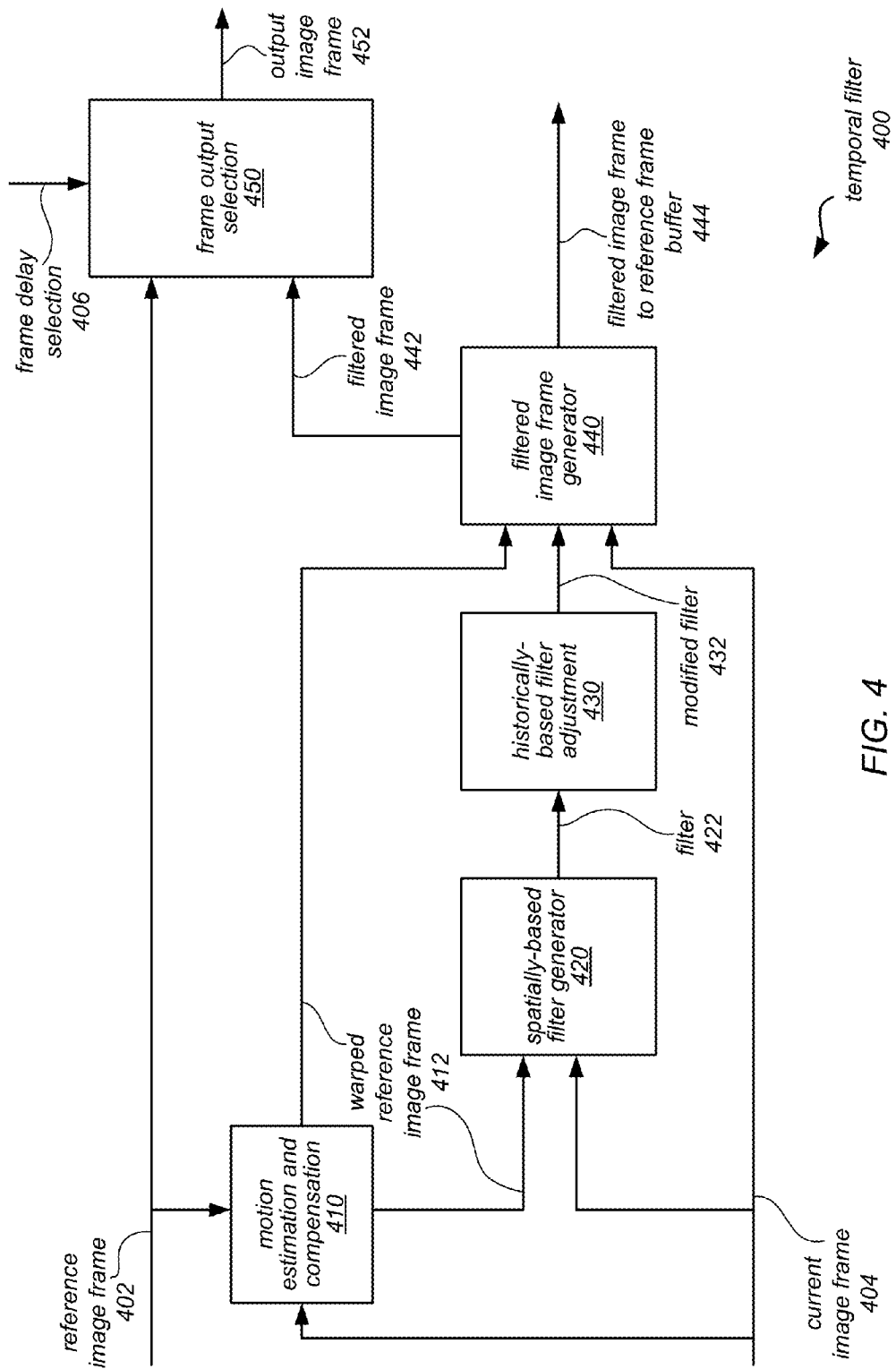
FIG. 4 is a logical block diagram illustrating a temporal filter that may be implemented as part of an image processing pipeline, according to some embodiments.

Please note that FIG. 4 is provided as merely an example of a temporal filter. Different combinations of the illustrated components (as well as components not illustrated) may be used to perform temporal filtering. For example, in some embodiments frame output selection component 450 may not be implemented. Similarly, in some embodiments, motion compensation and estimation component 410 may not be implemented. In some embodiments, spatially-based filter generator 420 may be implemented while historically-based filter adjustment module 430 may not be implemented, or conversely historically-based filter adjustment module 430 may be implemented while a different type of filter generator (e.g., a filter generator that determines pixel difference based on a given pixel and corresponding pixel alone) may be implemented. Thus, the components of FIG. 4 and their respective layout or ordering is not intended to be limiting to the various other combinations which may be used to implement temporal filter 400. Moreover, the image data received for filtering at the temporal filter module may be formatted in many different color spaces, and as such may not be limited to Raw or Bayer format.

Figure 5:
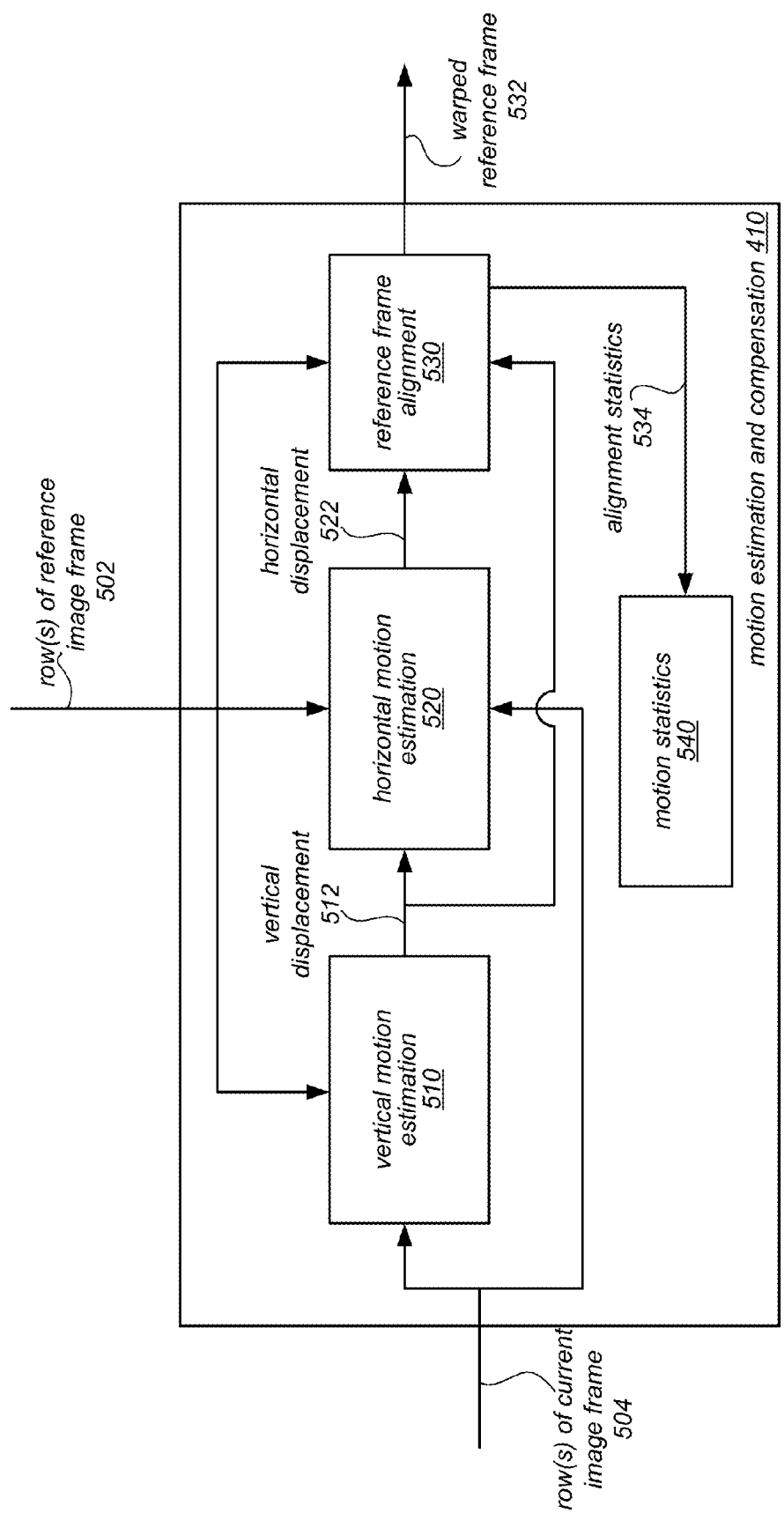
FIG. 5 is a logical block diagram illustrating a motion estimation and compensation module that may be implemented in a temporal filter, according to some embodiments.

FIG. 5 is a logical block diagram illustrating a motion estimation and compensation module that may be implemented in a temporal filter, according to some embodiments. Motion estimation and compensation module 410 may be configured to determine motion between a portion of the current image frame and a portion of the reference image frame based on a search for local displacements, in various embodiments. The determined motion estimate may, in some embodiments, be represented as a motion vector. A motion model may describe the respective portion of the current image frame for which a determined motion estimate (e.g., motion vector) applies. If, for example, the motion model indicates that the motion estimate is determined for a strip of two rows of a current image frame, then the determined motion estimate may be constant for each pixel within the strip of two rows (e.g., the same motion vector may be performed to warp the reference image frame with respect to each pixel in the strip of two rows). The motion model may, in some embodiments, be represented as an interval (e.g., a span of 4 rows) for which a motion estimate applies. Thus, a motion estimate for a first 4 rows of a current image frame may be determined, then another motion estimate may be determined for a second 4 rows, and so on. In various embodiments the motion model may be configurable (e.g., programmed by a control process), and may change for each next portion of an image and/or for a next image frame received for filtering.

As illustrated in FIG. 5, one or more rows of a current image frame 504 may be received at motion estimation and compensation module 410 as a stream of pixels. The pixels of the one or more rows may be, as discussed above in FIG. 4, normalized for brightness, in some embodiments. A corresponding number of one or more rows of a reference image frame 502 may also be received and/or evaluated (if already obtained from memory). As with the pixels of the current image frame, the pixels of the one or more rows of the reference image frame may be normalized for brightness. In various embodiments, the pixels may be formatted in a raw image format (e.g., formatted according to a Bayer image filter), although as discussed above, the pixels may be formatted in other color spaces.

Motion estimation and compensation module 410 may implement a vertical motion estimation module 510 configured to calculate a vertical motion estimate for the row(s) of current image frame 504 with respect to the row(s) of reference image frame 502, in some embodiments. Vertical motion estimation module 510 may receive the row(s) of a current image frame 504 and row(s) of a reference image frame 502. An average value of the pixel brightness of pixels in a row may be calculated for each row from the reference image frame. Similarly, the average value of the pixel brightness of pixels in the row(s) 504 of the current image frame may be calculated. Vertical motion estimation module 510 may then compare the differences between averages for the rows in the strip of rows with the row of the current image frame. A vertical shift or displacement may be determined based on the row average differences (e.g., the row average differences may indicate that a vertical shift of the reference image frame is 1 row above a current alignment).

Figure 8A:
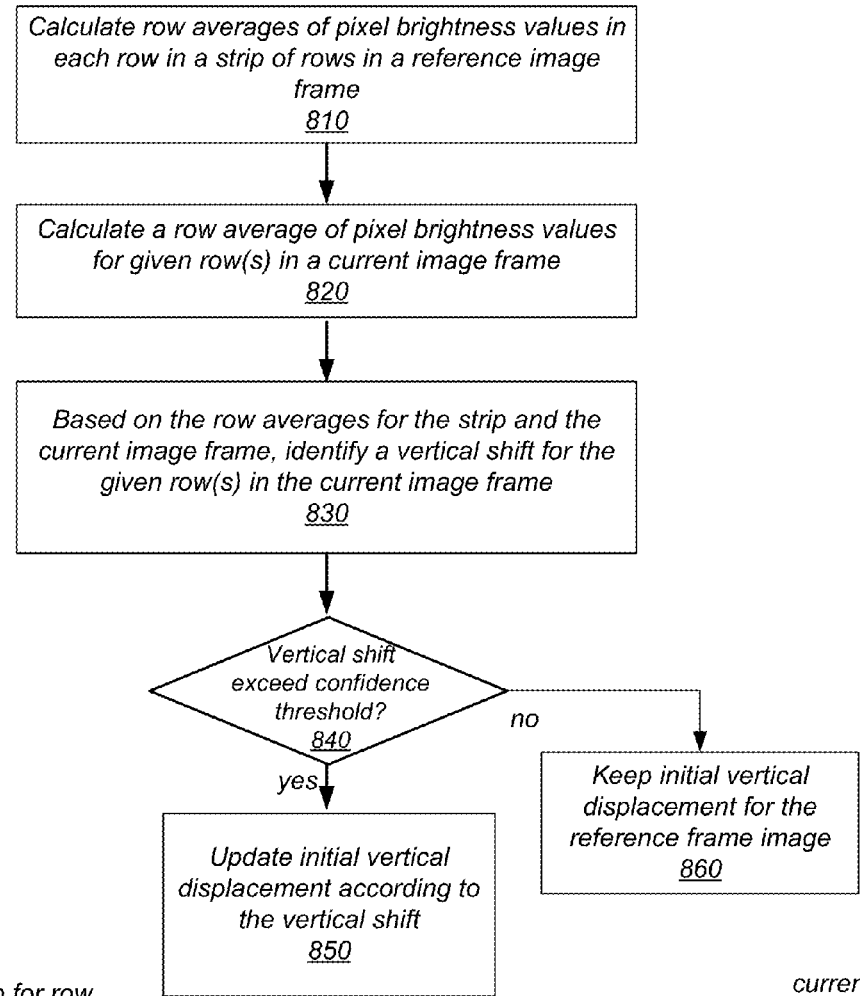
FIG. 8A is a high-level flowchart illustrating various methods and techniques for performing vertical motion estimation, according to some embodiments.

In some embodiments, vertical motion estimation module 510 may implement one or more confidence thresholds to be exceeded in order to change a vertical motion estimate from a previous vertical motion estimate from a prior row in the current image frame, various examples of which are described below with respect FIG. 8A. In some embodiments, vertical displacement 512 may be smoothed. Additionally, the rate of change for vertical displacement between one row and a subsequent row in an image frame may be limited, in at least some embodiments. FIG. 8A discussed in detail below provides further examples of the many different methods and techniques which may be implemented at vertical motion estimation module 510, and thus the previous discussion is not intended to be limiting as to the various other ways in which vertical motion may be estimated.

Vertical motion estimation module 510 may determine a vertical motion estimate, which may be represented as a vertical shift or displacement 512. In some embodiments, the vertical displacement 512 may be provided to horizontal motion estimation module 520 for use in determining a horizontal motion estimate. However, in some embodiments, vertical displacement 512 may not be used or provided at horizontal motion estimation 520. In some embodiments, the vertical motion estimate may determine whether one or more additional rows of the reference frame are read in from memory, which may allow the temporal filter module 400 to efficiently perform reading and writing operations for performing motion estimation. For example, a row of a reference image frame may be read in 502 only once to perform motion estimation. As the vertical displacement 512 increases then reading new rows 502 from the reference image frame may be accelerated so that the next row of the current image frame 502 received is vertically aligned to the newly read row of the reference image frame. Alternatively, if the vertical displacement 512 decreases then reading new rows 502 from the reference image frame may be stalled so that the next row of the current image frame 502 received is vertically aligned to a previously read row of the reference image frame.

In some embodiments, motion estimation and compensation module 410 may implement horizontal motion estimation module 520. Horizontal motion estimation module 520 may be configured to calculate a horizontal motion estimate for the row(s) of current image frame 504 with respect to the row(s) of reference image frame 502. Horizontal motion estimation module 520 may receive the row(s) of a current image frame 504 and row(s) of a reference image frame 502. Horizontal motion estimation module 520 may then blur pixel values for the row of the current image frame 504 and the pixel values of the row of the reference image frame 502. Horizontal motion estimation module 520 may then determine difference values for each pixel in the row of the current image frame using the blurred pixel values of the row in the current image frame and the reference image frame. For example, for a given pixel, the differences between a pixel and the pixel one horizontal pixel shift to the left and to the right from the given pixel may be determined. Based on the differences (e.g., a sum of absolute differences for each row), a horizontal shift or displacement for the row(s) of reference image frame 502 may be identified (e.g., the differences for the rows may indicate the horizontal shift as the best match for the row(s) of the current image frame 504).

As with the vertical motion estimation module 510 above, horizontal motion estimation module 520 may implement one or more confidence thresholds to be exceeded in order to change a horizontal motion estimate from a previous horizontal motion estimate for a prior one or more rows (e.g., prior interval) in the current image frame. In some embodiments, horizontal displacement 522 may be smoothed. Additionally, the rate of change for horizontal displacement between one row and a subsequent row in an image frame may be limited, in at least some embodiments. FIG. 9A discussed in detail below provides further examples of the many different methods and techniques which may be implemented at horizontal motion estimation module 510, and thus the previous discussion is not intended to be limiting as to the various other ways in which horizontal motion may be estimated. Horizontal motion estimate module 520 may provide horizontal displacement 522 (which may indicate the horizontal estimate) to reference frame alignment module 530.

In some embodiments, motion estimation and compensation module 410 may implement reference frame alignment module 530. Reference frame alignment module 530 may receive vertical displacement 512 and horizontal displacement 522 and may be configured to align the reference image frame according to the motion estimates, and provide a warped reference image frame 532 for further processing at temporal filter 400. Reference frame alignment module 530 may implement various kinds of alignment and/or warping techniques. For example, new pixel locations for the reference image frame may be mapped according to displacements 512 and 522. Resampling techniques, such as linear resampling, may be used to determine pixel values at the new pixel location, in some embodiments. In some embodiments, the noise history values (as discussed above with regard to FIG. 4) for each pixel in the reference image frame may also be warped or aligned.

In at least some embodiments, motion estimation and compensation module 410 may implement motion statistics module 540. Motion statistics module 540 may receive alignment statistics 534 (e.g., values that indicate the fit between a pixel in the current image frame and the reference image frame) from reference frame alignment module 530. Motion statistics module 540 may perform various analysis, modifications, or manipulations of the alignment statistics. For example, in some embodiments, a histogram may be generated describing the fit between the reference image frame and the current image frame. A control process, or other component, may access the histogram to determine whether a good or bad fit between the images was performed using motion estimation and compensation. In some embodiments, interpretation of the histogram may be performed by a control process to adjust or configure various parameters of motion estimation and compensation module 410 (e.g., initial displacements for horizontal and vertical motion estimations). In some embodiments, motion statistics may track, record (e.g., in a memory or other storage component) the motion estimates made for the current image frame. For example, the motion vectors may be stored periodically for different rows of the current image frame at intervals. These motion vectors may be provided to a control process (or other component) in ISP 106 to programmatically configure the component for processing the current image frame (e.g., a component that helps to remove rolling shutter artifacts). Motion statistics module 540 may provide, in some embodiments, a count or percentage of pixels in a current image frame that are a "good" fit (which may be determined according to some programmed fitness threshold).

Although not illustrated, determining motion estimates may be disabled or already determined motion estimates replaced with motion estimates provided by a control process (e.g., motion vectors or other displacement indications). For example, a control process may send a request to central control module 320 to program motion estimation and compensation module 410 to disable motion detection and utilize a particular input motion vector parameter to perform reference frame alignment. In some scenarios, a motion estimate may be determined for a portion of an image frame (e.g., left half or strip of an image) which is processed at an image processing pipeline separately from another portion of the image frame. When the other portion is processed at the temporal filter module, a control process may provide the motion estimate determined for the first portion to be used for aligning and filtering the second portion of the image frame.

Figure 6:
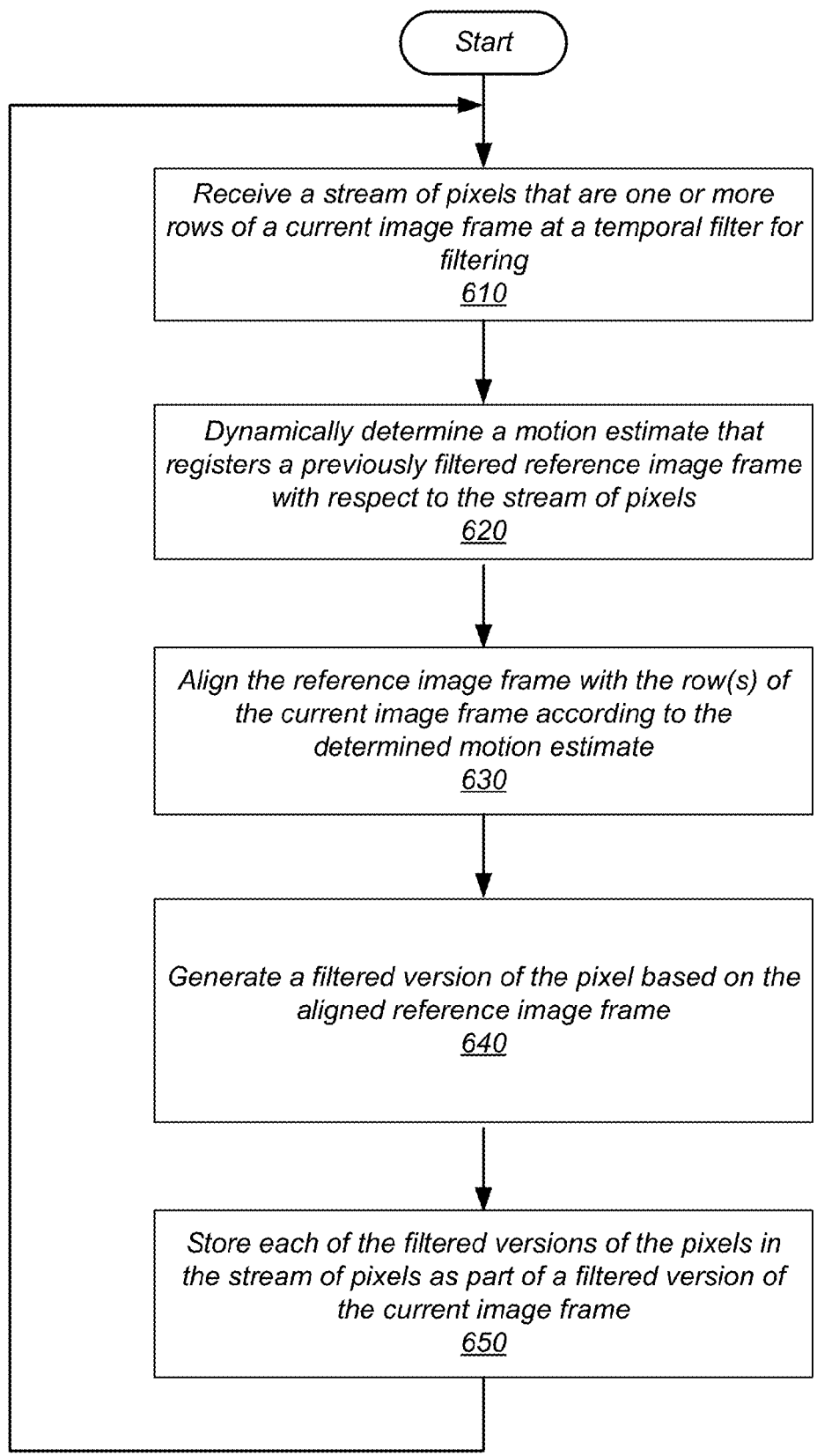
FIG. 6 is a high-level flowchart illustrating various methods and techniques for performing dynamic motion estimation and compensation for temporal filtering, according to some embodiments.

FIG. 6 is a high-level flowchart illustrating various methods and techniques for performing dynamic motion estimation and compensation for temporal filtering, according to some embodiments. Various ones of the components in the temporal filter discussed above in FIG. 4 may perform the following techniques, as well as other different embodiments of a temporal filter. A stream of pixels that make up one or more rows of a current image frame received at temporal filter for filtering may be received, as indicated at 610. As discussed above, the number of rows for which the motion estimate is applicable may be determined according to a motion model (e.g., an interval of one or more rows). Also noted earlier, image data captured at image sensors is often streamed live from the sensor into an image processing pipeline, and thus the stream of pixels of the current image frame may be the only image data which may be compared to the reference image frame for the purposes of motion estimation and compensation (although the image data may also be received from other sources than the image sensor such as from a storage location in memory). In at least some embodiments the pixel may be in a raw image format (e.g., Bayer format).

As indicated at 620, a motion estimate may be dynamically determined that registers a previously filtered reference image frame with respect to the stream of pixels in the row of the current image frame. Dynamic determination of a motion estimate, discussed in more detail below with regard to FIGS. 7-9B, may be performed on-the-fly for live image data as it is received from the image sensor (via other units, modules and/or components in the image processing pipeline). The motion estimate may be represented, in some embodiments, as a motion vector which indicates a two dimensional (horizontal and vertical) motion between the reference image frame with respect to the row in the current image frame. Once determined, at least a portion of the reference image frame may be aligned with the row of the current image frame according to the motion estimate, as indicated at 630. Alignment, as noted earlier, may be performed in many different ways, performing various kinds of alignment and/or warping techniques. Mapping and resampling techniques, for instance, may be used to determine pixel values at the new pixel locations for the reference image frame, in some embodiments.

As indicated at 640, a filtered version for each of the pixels in the stream of pixels may be generated based, at least in part, on the aligned reference image frame. Various different classes of filters or techniques may be implemented. As illustrated in FIG. 4, a temporal filtering technique may be employed to blend each of the pixels of the current image frame with a different corresponding pixel in the aligned reference image frame in order to generate a respective filtered version of each pixel, in some embodiments. In some embodiments, a respective filter weight for the blending each pixel with the different corresponding pixel in the aligned reference image frame may be determined. For example, the difference between each pixel and the different corresponding pixel may be calculated, and based on the difference the filter weight determined (e.g., the more similar the frames, the more of the reference image frame may be blended). In some embodiments, as noted above with regard to spatially-based filter generator 420 in FIG. 4, the filter weight may be determined based, at least in part, on a difference between neighboring pixels of each pixel in the current image frame and corresponding pixels in the aligned reference image frame neighboring the different corresponding pixel. One or more spatial filtering techniques, for instance, may be applied to the calculated difference between neighboring pixels of each pixel in the current image frame and the aligned reference image frame. The filtered difference value of each pixel may be interpolated to identify a filter weight that corresponds to how well the aligned reference image frame and the current image frame match. The filter weight may indicate, for instance, that the images are similar, and thus more of the aligned reference image frame may be blended into a filtered version of each pixel than the current image frame.

Once a filter weight is determined, each pixel and the different corresponding pixel may be blended according to the filter weight. For example, the filter weight may be represented as a mixing ratio k, where k portion of the aligned reference image frame and 1−k portion of the current image frame are blended together, and where 0<k<1. If, for instance, k=0.3, then the pixel value of the corresponding pixel in the aligned reference image frame (e.g., 25) may be multiplied by 0.3, equaling 7.5, and where the pixel value of a pixel current image frame (e.g., 27) may be multiplied by 0.7, equaling 18.9. Thus, the value of the filtered version of the pixel may be 26.4. Please note, that the previous example of blending is not intended to be limiting as various other filter weight representations and blending techniques may be implemented.

In some embodiments, the filtered version of each pixel may be stored as part of a filtered version of the current image frame, as indicated 650. For example, each pixel value may be written to a system memory or other data storage component accessible by a temporal filter. As the filtered version of each pixel may be retrieved from storage when processing a subsequent image frame, each pixel value may be stored in a particular format to aid subsequent processing (e.g., assigning a certain number of bits to pixel value data and assigning a certain number of bits for pixel metadata, such as noise history).

Dynamic motion estimation and compensation may be performed as part of processing rows in a current image frame received for filtering at a temporal filter (or other class of filter), as indicated by the arrow looping element 650 back to element 610. In this way, a new motion estimate and alignment may be determined for additional rows in the current image frame. Please note that a "new" motion estimate and alignment does not denote that the motion estimate is different between each row. In some instances, the motion estimate may not be different between row (e.g., if the motion model indicates an interval greater than 1). However, it may also be that the motion estimate may differ from one row or rows of an interval to the next row or rows of an interval of a current image frame.

Figure 7:
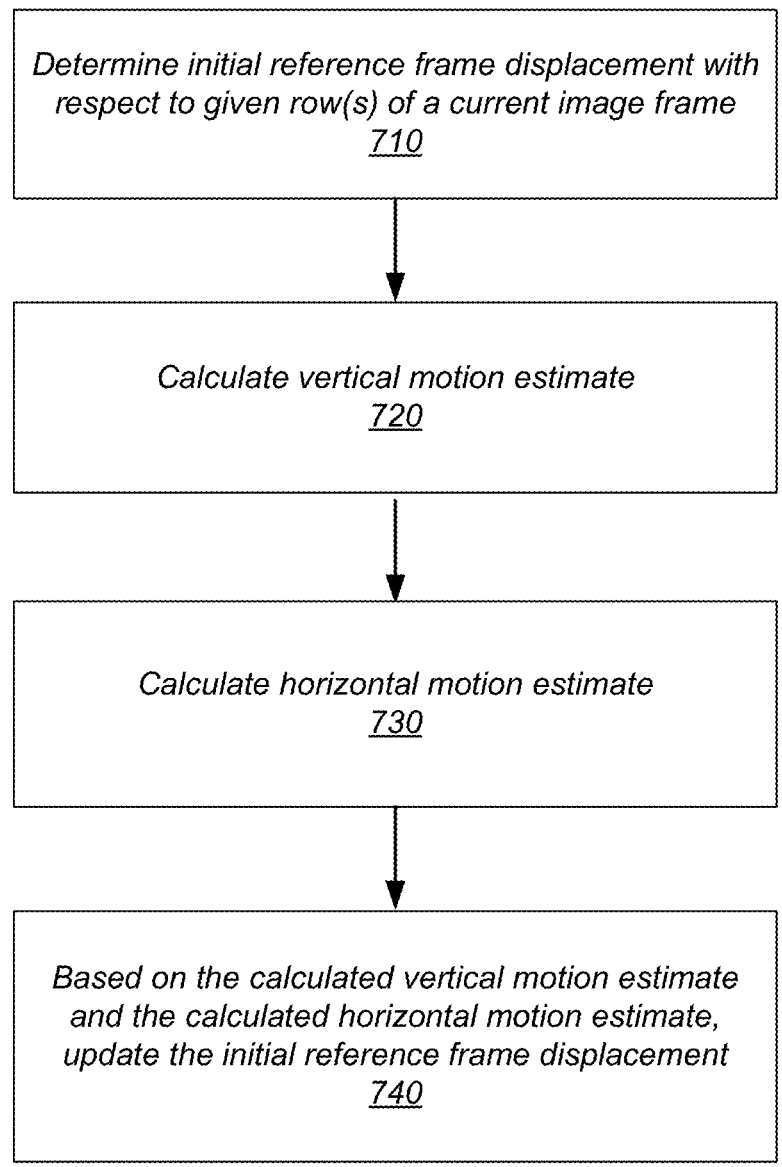
FIG. 7 is a high-level flowchart illustrating various methods and techniques for dynamically estimating motion for one or more rows of an image frame received for filtering at a temporal filtering module, according to some embodiments.

FIG. 7 is a high-level flowchart illustrating various methods and techniques for dynamically estimating motion for one or more rows of an image frame received for filtering at a temporal filtering module, according to some embodiments. As indicated at 710, an initial reference frame displacement may be determined for a reference image frame with respect to the one or more rows of a current image frame that is being filtered at the temporal filter, in some embodiments. For example, an initial reference frame displacement may be determined based on a motion estimate for an immediately previous row or rows (e.g., an interval of rows as indicated by a motion model) in the current image frame. In another example, the initial reference frame displacement may be determined using default displacement values (e.g., default horizontal and/or vertical displacement values). In some embodiments, a control process or other component of an image processing pipeline may set or configure the initial reference frame displacement.

Figure 8B:
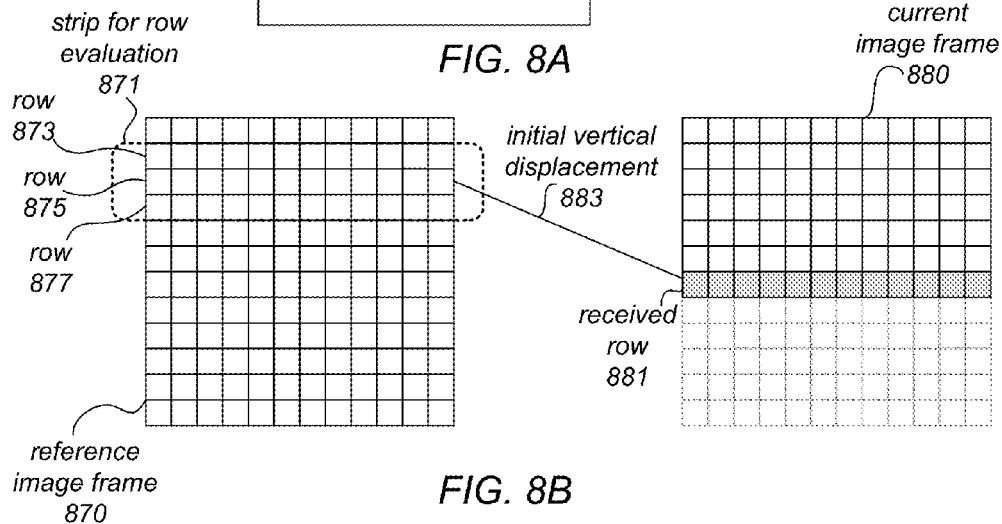
FIG. 8B is an example illustration of a current image frame and a reference image frame, according to some embodiments.

As indicated at 720, a vertical motion estimate may be determined for the reference image frame with respect to the one or more rows of pixels in the current image frame. FIG. 8A is a high-level flowchart illustrating various methods and techniques for performing vertical motion estimation, according to some embodiments. A strip of rows may be identified or selected for determining the vertical motion estimate, in some embodiments. The number of rows in the strip of rows may be based on the number of the one or more rows in the interval of rows as described by the motion model, in some embodiments, and may be programmed or determined by a control process in some embodiments. The strip of rows may include the one or more rows indicated as corresponding to the one or more rows of pixels in the current image frame. By limiting the number of rows in strip 871, the rate of change to the estimated motion may be limited (e.g., only evaluating a row above and below a row corresponding to the given one or more rows may limit the change to incrementing or decrementing vertical displacement by a row). FIG. 8B illustrates a reference image frame 870, which may read in or retrieved from a memory or other storage device accessible to a temporal filter (e.g., via a direct memory access (DMA) channel).

Current image frame 880 in FIG. 8B illustrates a current image frame that is being filtered at a temporal filter. Received row 881 may be the row of pixels for which dynamic motion estimation is being performed (e.g., the motion model may indicate an interval of 1 row for performing motion estimation). Strip 871 for row evaluation may include as an example 3 rows, 873, 875, and 877. As illustrated at 883, received row initially corresponds to row 875 as determined by the initial reference frame displacement.

As indicated at 810, in various embodiments, row averages may be calculated for pixel brightness values in each row in the strip of rows in a reference image frame. In FIG. 8B, for example, row averages maybe calculated for rows 873, 875, and 877. Each of the pixels in these rows may have a respective pixel brightness value which may be averaged across the row (e.g., row 873 has row average pixel brightness value of 98, row 875 has an average of 90, and row 877 has an average of 94). As indicated at 820, row averages for the pixel brightness values for given one or more rows (e.g., the number of rows indicated by the motion model) in a current image frame may be calculated, in some embodiments (e.g., given row 881 has an average value of 93). Based on the row averages for the strip (e.g., 873, 875 and 877 in strip 871) and the row average of the given row(s) in the current image frame (e.g., 881), a vertical shift may be identified for the given one or more rows in the current image frame, as indicated at 830. For example, in some embodiments, the sum of the absolute value of differences between the row average for each of the rows in the strip and the row(s) of the current image may be determined (e.g., absolute value of 98-93 for row 873-row 881, absolute value of 90-93 for row 875-row 881, and absolute value of 94-93 for row 877-row 881). The lowest sum of the absolute value of differences may indicate the row of the reference image frame that best fits the row(s) of the current image frame. In the above example, row 877 (with a sum absolute difference value of 1) is the smallest of the rows in the strip 871. A vertical shift may be determined in order to align the rows of the two image frames according to the row providing the best fit.

In some embodiments, one or more confidence thresholds may be implemented to determine whether or not the vertical shift should be applied to adjust the vertical motion estimate, as indicated at 840. For example, in some embodiments the difference between the initial vertical displacement and the given row(s) (e.g., row 875 and row 881) may be evaluated with respect to the confidence threshold. If the difference is greater than a minimum amount (e.g., 2), then the match may exceed the confidence threshold (e.g., absolute value of (-3) is greater than 2). Other confidence measures may be additionally, or alternatively, implemented. For example, an edge count may be maintained, and if, as a result of the vertical shift, the number of edges exceed an edge count threshold, then the vertical shift may be applied. Other confidence measures may include comparing a distance between edges (coordinate spread) value to a threshold for the vertical shift or determining whether the contrast between row averages for the vertical shift exceeds a minimum threshold. However determined, if the best match exceeds the confidence threshold(s), as indicated by the positive exit from 840, then the initial vertical displacement for the reference image frame may be updated, as indicated at 850. Continuing with the above example, as row 877 is one row down, then the vertical displacement may be decremented (e.g., the gap between the two rows may shrink). If, however, the best match does not exceed the confidence threshold, then as indicated by the negative exit from 840, the initial vertical displacement for the reference image frame may be maintained (e.g., stay the same), as indicated at 860. Please note that the illustrations in FIG. 8B are not intended to be limiting as to the size of image frames, number of rows in an evaluation strip, number of rows in the current image frame, or any other format or application of the discussed estimation techniques.

As indicated at 730, a horizontal motion estimate may be calculated for the given one or more rows of the current image frame, in various embodiments. In some embodiments, a dead or defective pixel correction technique may be applied to the reference image frame prior to determining the horizontal motion estimate. For instance, a 1D dot removal technique may be implemented to remove defective pixels before performing horizontal motion estimation. In this way streaks caused by defective pixels may be prevented. FIG. 9A is a high-level flowchart illustrating various methods and techniques for performing horizontal motion estimation, according to some embodiments. In some embodiments, the vertical motion estimate, determined at element 720 above, may be used to perform horizontal motion estimation. For instance, the changed vertical displacement in the example above may be used to determine which row to evaluate in the reference image frame for performing horizontal motion estimation. As indicated at 983, in FIG. 9B row 981 (which may correspond to row 881), may correspond to row 977. The pixel brightness values for the given one or more rows of the current image frame may be blurred in addition to one or more rows in a strip of rows in the reference image frame that is identified by a vertical displacement for the one or more rows, as indicated at 910. The number of rows in the strip of rows may be based on the number of the one or more rows in the interval of rows as described by the motion model, in some embodiments, and may be programmed or determined by a control process in some embodiments. The strip of rows may include the one or more rows indicated as corresponding to the one or more rows of pixels in the current image frame. Different blurring techniques may be applied, in some embodiments. For example, a tent filter may be applied to each pixel in the given one or more rows of the current image frame and the strip of rows of the reference image frame. Row 981 in reference image frame 880 may be blurred, and row 977 in reference image frame 870 may be blurred, in FIG. 9B.

Based on the blurred pixel brightness values in the given one or more rows of the current image frame and the blurred pixel brightness values in the strip of rows of the reference image frame, a horizontal shift may be identified for the given one or more rows in the current image frame, as indicated at 920, in various embodiments. For example, the sum of absolute differences for each pixel in the given one or more rows compared to a pixel in the strip of rows of the reference image frame shifted horizontally may be determined. In FIG. 9B, for example, the blurred pixel values of row 981 may be compared to the blurred pixels in rows in strip 971 (which may be set to a default or programmatically by a control process). The row 981 may be shifted left to calculate difference values between the row 981 and strip of rows 971. Similar difference values may be determined for leaving the row 981 not shifted, and shifted right. After summing the absolute value of the differences for left shifts, no shifts, and right shifts, the shift with the smallest absolute difference may be identified as the horizontal shift, in some embodiments.

Similar to the discussion above with regard to FIG. 8A, in some embodiments, a confidence threshold may be implemented to determine whether or not the horizontal motion estimation using the best match may be confident, as indicated at 930. For example, in some embodiments the difference between the sum of absolute difference values for no shift may be evaluated with respect to the confidence threshold. If the difference is greater than a minimum amount, then the match may exceed the confidence threshold. Other confidence measures may be additionally, or alternatively, implemented. For example, an edge count may be maintained, and if, as a result of the horizontal shift, the number of edges exceed an edge count threshold, then the horizontal shift may be applied. Other confidence measures may include comparing a distance between edges (coordinate spread) value to a threshold for the horizontal shift.

However determined, if the shift exceeds the confidence threshold, as indicated by the positive exit from 930, then the initial horizontal displacement for the reference image frame may be updated, as indicated at 940. For example, if a left shift is the identified best match, then the initial reference frame horizontal displacement may be decremented (e.g., shifting the reference image frame left). If, however, the horizontal shift does not exceed the confidence threshold, then as indicated by the negative exit from 930, the initial horizontal displacement for the reference image frame may be maintained (e.g., stay the same), as indicated at 950. Please note that the illustrations in FIG. 9B are not intended to be limiting as to the size of image frames, width of pixels in an evaluation window, or any other format or application of the discussed estimation techniques.

Please note, that in some embodiments the pixel data may be formatted according to a Bayer image filter. In such embodiments, like rows in a Bayer quad (Red-Green rows or Green-Blue rows) may be compared for performing vertical estimation. Similarly for horizontal estimation, like color channels in a row may be compared (e.g., Gr with Gr, B with B, R with R, or Gb with Gb).

As indicated at 740, the initial reference frame displacement may be updated based on the calculated vertical motion estimate and the calculated horizontal motion estimate, in some embodiments. For example, displacement values for vertical or horizontal may be incremented and or decremented. As noted earlier, in some embodiments the rate of change to a reference frame display may be limited. For example, displacement changes may in some embodiments be limited to a fixed size increase or decrease in displacement (e.g., 1 or 2 rows up or down for vertical displacement and/or 1 or 2 pixels left or right for horizontal displacement). FIGS. 8A and 9A, discussed above, indicate that in some embodiments, vertical and/or horizontal motion estimates may be first evaluated with respect to a confidence threshold. If it is determined that the vertical or horizontal motion estimate exceeds the confidence threshold, then it may be applied to update the initial reference frame displacement. Please note, that in some embodiments horizontal and vertical updates to the initial frame displacement and/or the motion estimate more generally may be applied independently. For instance, if the horizontal motion estimate does exceed the confidence threshold, but the vertical motion estimate does not, then the horizontal motion estimate may be applied while the vertical motion estimate may not be applied (leaving the vertical portion of the motion estimate unchanged for the given one or more rows of pixels). In some embodiments, the updated reference frame displacement (with applied vertical and horizontal motion estimates) may be smoothed. For example, the updated reference image frame may be averaged with one or more previously determined motion estimates. As new motion estimates for new rows in the current image are made, the motion estimate may be determined as a rolling average of previously determined motion estimates, in some embodiments. In various embodiments, the updated reference frame displacement may be provided as the determined motion estimate, in various embodiments, and may be represented as a motion vector.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. An apparatus, comprising:
   a memory; and
   an image signal processor comprising a temporal filter module, wherein the image signal processor is configured to:
   dynamically determine a motion estimate that registers a previously filtered reference image frame with respect to a given stream of pixels that comprise one or more rows of a current image frame received at the temporal filter module for filtering;
   warp at least a portion of the reference image frame according to the determined motion estimate;
   generate respective filtered versions of the given stream of pixels as part of a filtered version of the current image frame based, at least in part on the warped portion of the reference image frame; and
   write the respective filtered versions of the given stream of pixels to the memory to be maintained as part of a filtered version of the current image frame replacing the current image frame.

2. The apparatus of claim 1, wherein to dynamically determine the motion estimate that registers the previously filtered reference image frame with respect to the given stream of pixels, the image signal processor is configured to:
   determine an initial reference frame displacement with respect to the one or more rows of the current image frame;
   calculate a vertical motion estimate, wherein the vertical motion estimate indicates a comparison between the one or more rows of the current image frame and the reference image frame;
   calculate a horizontal motion estimate, wherein the horizontal motion estimate indicates a comparison between the one or more rows of the current image frame and the reference image frame; and
   based on the calculated vertical motion estimate and the calculated horizontal motion estimate, update the initial reference frame displacement to determine the motion estimate.

3. The apparatus of claim 1, wherein the stream of pixels are formatted according to a Bayer image filter.

4. The apparatus of claim 1, wherein the image signal processor comprises a plurality of image processing components including the temporal filter module, wherein the image signal processor is further configured to evaluate the warp of at least the portion of the reference image frame to determine one or more motion estimation statistics for the stream of pixels to configure one or more of the plurality of image processing components for processing the stream of pixels.

5. The apparatus of claim 1, wherein the apparatus comprises a mobile computing device.

6. A method, comprising:
   dynamically determining, by an image signal processor, a motion estimate that registers a previously filtered reference image frame with respect to a given stream of pixels that comprise one or more rows of a current image frame received at a temporal filter module for filtering;
   aligning, by the image signal processor, the reference image frame with the one or more rows of the current image frame according to the determined motion estimate; and
   generating, by the image signal processor, respective filtered versions of the given stream of pixels as part of a filtered version of the current image frame based, at least in part, on the aligned reference image frame.

7. The method of claim 6, wherein dynamically determining the motion estimate that registers the previously filtered reference image frame with respect to the given stream of pixels comprises:
   determining an initial reference frame displacement with respect to the row of the current image frame;
   calculating a vertical motion estimate, wherein the vertical motion estimate indicates a comparison between the one or more rows of the current image frame and the reference image frame;
   calculating a horizontal motion estimate, wherein the horizontal motion estimate indicates a comparison between the one or more rows of the current image frame and the reference image frame; and
   based on the calculated vertical motion estimate and the calculated horizontal motion estimate, updating the initial reference frame displacement to determine the motion estimate.

8. The method of claim 7, wherein calculating the vertical motion estimate comprises:
   calculating respective row averages of pixel brightness values in each row within a strip of one or more rows in the reference image frame, wherein the strip of rows is identified based, at least in part, on the initial reference frame displacement;
   calculating a row average of pixel brightness values of the stream of pixels comprising the one or more rows of the current image frame; and
   based, at least in part, on the respective row averages for each row in the strip of rows and the row averages for the one or more rows of the current image frame, identifying a vertical shift for the one or more rows of the current image frame.

9. The method of claim 7, wherein calculating the horizontal estimation comprises:
   blurring pixel brightness values of the stream of pixels in the one or more rows of the current image frame;
   blurring pixel brightness values in each row in a strip of one or more rows of the reference image frame, wherein the strip of rows is identified based on the calculated vertical motion estimate; and based, at least in part, on the blurred pixel brightness values for the one or more rows of the current image frame and the strip of rows of the reference image frame, identify a horizontal shift for the one or more rows of the current image frame.

10. The method of claim 7, wherein updating the initial reference frame displacement to determine the motion estimate comprises:
applying the calculated vertical motion estimate and the calculated horizontal motion estimate to modify the initial reference image frame; and
averaging one or more previously determined reference frame displacements with the modified initial reference frame displacement to provide an averaged reference frame displacement as the motion estimate.

11. The method of claim 6, wherein a stream of pixels comprising a subsequent row of the current image frame is received at the temporal image filter for filtering, wherein the determining, the aligning, and the generating are performed for the stream of pixels comprising the subsequent row of the current image, and wherein the determined motion estimate for the stream of pixels comprising the subsequent row of the current image frame is different than the determined motion estimate for the stream of pixels for the row of the current image frame.

12. The method of claim 5, further comprising adjusting pixel brightness values for the given stream of pixels of the current image frame and the reference image frame such that the pixel brightness values for the given stream of pixels of the current image frame and the reference image frame are normalized.

13. The method of claim 6, wherein the image signal processor is implemented as part of a mobile computing device.

14. A system, comprising:
a device configured to perform image processing, the device comprising:
a sensor interface configured to receive image data from an image sensor; and
an image processing pipeline comprising a temporal filter module, the image processing pipeline configured to:
dynamically determine a motion estimate that registers a previously filtered reference image frame with respect to a given stream of pixels that comprise one or more rows of a current image frame received at the temporal filter module for filtering;
warp at least a portion of the reference image frame according to the determined motion estimate; and
generate respective filtered versions of the given stream of pixels to replace the current image frame as part of a filtered version of the current image frame based, at least in part, on the warped reference image frame.

15. The system of claim 14, wherein to dynamically determine the motion estimate that registers the previously filtered reference image frame with respect to the given stream of pixels, the image processing pipeline is configured to:
determine an initial reference frame displacement with respect to the one or more rows of the current image frame;
calculate a vertical motion estimate, wherein the vertical motion estimate indicates a comparison between the one or more rows of the current image frame and the reference image frame;
calculate a horizontal motion estimate, wherein the horizontal motion estimate indicates a comparison between the one or more rows of the current image frame and the reference image frame; and
based on the calculated vertical motion estimate and the calculated horizontal motion estimate, update the initial reference frame displacement to determine as the motion estimate.

16. The system of claim 15, wherein to dynamically determine the motion estimate that registers the previously filtered reference image frame with respect to the given stream of pixels, the image processing pipeline is configured to apply a defective pixel removal technique to the reference image frame.

17. The system of claim 15, wherein to update the initial reference frame displacement to determine the motion estimate, the image processing pipeline is configured to:
apply at least one of the calculated vertical motion estimate and the calculated horizontal motion estimate to modify the initial reference image frame; and
average one or more previously determined reference frame displacements with the modified initial reference frame displacement to provide an averaged reference frame displacement as the motion estimate.

18. The system of claim 15, wherein to update the initial reference frame displacement to determine the motion estimate, the image processing pipeline is configured to:
determine that the calculated vertical motion estimate exceeds a vertical estimate confidence threshold; or
determine that the calculated vertical motion estimate exceeds a vertical estimate confidence threshold.

19. The system of claim 14, wherein a control process for the image processing pipeline configures a number of the one or more rows for which the motion estimate is determined.

20. The system of claim 14, wherein the system is a mobile computing device, and wherein the device is an image signal processor.

* * * * *